(12) United States Patent
Pinchevski

(10) Patent No.: US 9,273,819 B2
(45) Date of Patent: Mar. 1, 2016

(54) ADJUSTABLE MAGNETIC MOUNT FOR METROLOGY EQUIPMENT

(71) Applicant: ACQUIP, INC., Miami Beach, FL (US)

(72) Inventor: Alan Pinchevski, Coral Springs, FL (US)

(73) Assignee: ACQUIP, INC, Miami, FL (US)

(*) Notice: Subject to any disclaimer, the term of this patent is extended or adjusted under 35 U.S.C. 154(b) by 53 days.

(21) Appl. No.: 14/298,385

(22) Filed: Jun. 6, 2014

(65) Prior Publication Data

US 2015/0354750 A1    Dec. 10, 2015

(51) Int. Cl.
*F16B 1/00* (2006.01)
*F16M 11/38* (2006.01)

(52) U.S. Cl.
CPC ........ *F16M 11/38* (2013.01); *F16B 2001/0035* (2013.01)

(58) Field of Classification Search
USPC .......... 248/683, 309.4, 206.5; 269/8; 206/818
See application file for complete search history.

(56) References Cited

U.S. PATENT DOCUMENTS

| 2,884,698 | A | * | 5/1959 | Wursch | B23K 37/0435 24/303 |
| 3,245,400 | A | * | 4/1966 | Bowman | A47J 36/34 126/261 |
| 4,300,754 | A | * | 11/1981 | Lawrence | B23K 37/0435 269/208 |
| 6,279,885 | B1 | * | 8/2001 | Leon, Jr. | B23K 37/0435 269/239 |
| 8,616,335 | B1 | * | 12/2013 | Mosier | E06C 7/188 182/107 |
| 2008/0122149 | A1 | * | 5/2008 | Kegeris | B25B 11/002 269/8 |
| 2009/0051090 | A1 | * | 2/2009 | Barnes, Jr. | B23K 37/0533 269/8 |
| 2011/0073722 | A1 |  | 3/2011 | Meuret et al. | |

* cited by examiner

*Primary Examiner* — Alfred J Wujciak
(74) *Attorney, Agent, or Firm* — Christine Vicari

(57) ABSTRACT

The present invention is directed to an adjustable mounting apparatus comprising: a base, a first and second magnet each pivotally connected to the bottom of the base and rotatable about a predefined axis. The first and second magnets are positioned at opposing ends of the base and parallel to each other. The present invention is also directed to a method of stabilizing an adjustable mounting apparatus comprising: placing the mount onto a surface; rotating a first and second electric magnet at angles along predefined axes; engaging a clamping lever to place each magnet into desired positions on the surface; electrifying the first and second electric magnets to attach them to the surface.

8 Claims, 9 Drawing Sheets

ADJUSTABLE MAGNETIC MOUNT FOR METROLOGY EQUIPMENT

The present invention relates to an adjustable mounting apparatus, and more particularly, a portable adjustable mounting apparatus used hold laser trackers or other metrology equipment in a stable position.

BACKGROUND OF INVENTION

Many industries use laser trackers and other portable coordinate measuring equipment to take precise 3D measurements for a number of applications, including: manufacturing, parts inspection, alignments, reverse engineering and more. In many such applications measurement errors on the order of even one thousandth of an inch can be critical. Thus, it is important that the measuring equipment being used be stably supported.

In the power generation, oil, gas, petrochemical and marine industries, it is often necessary to take measurements with a laser tracker or other type of coordinate measuring equipment on an uneven surface. Often times, the device must be mounted on the inner portion of large pipes with curved surfaces. Taking accurate measurements from this perspective can be challenging, and difficult. Several attempts have been made to provide a stand capable of supporting the measurement devices, including portable metrology stands and tripods. However, these types of devices fall short for several reasons.

While the tripod type of portable device has adjustable legs, the adjustment occurs in a very fixed and restricted type of motion. Attempting to mount a portable tripod stand on an uneven curved surface can be difficult if not impossible. The unit also tends to be unstable, which results in inaccurate readings. The legs themselves are also thin and do not have high contact with the surface area of the pipe, allowing for additional instability. Tripods must be positioned on a flat, stable surface to provide the necessary stability required for such accurate measurements.

The portable stands are also less than ideal for taking measurements on curved surfaces. While some of the portable stands have slightly larger feet, allowing for greater surface area contact, they also are designed for a flat, smooth surface, and do not make complete contact with the internal curved surface of a pipe or other uneven surface, thus preventing accurate measurements.

Finally, there have also been attempts to make stands with rectangular or circular magnetic bases. While the magnets allow the stands to attach to a surface plate, tool bed, object, or other ferrous surface, they fall short in that they are unable to take accurate measurements in locations where the surface is curved or uneven.

All of these devices fall short because they require a perfectly flat and smooth surface for the mounts to properly adhere. Thus there is a need for a device that overcomes the above listed and other disadvantages.

SUMMARY

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

To resolve the problems discussed above, the invention is directed towards an adjustable mounting apparatus for metrology equipment, the apparatus comprising: a base, with a top and a bottom surface, the base defining a horizontal plane; a first magnet pivotally connected to the bottom of the base, and rotatable about a first predefined axis; and a second magnet pivotally connected to the bottom of the base, and rotatable about a second predefined axis. The first and second magnets are positioned at opposing ends of the base and parallel to each other.

In another embodiment of the invention, it is envisioned that the apparatus further comprises: a first hinge and a second hinge. The first hinge comprising: a first hinge component fixed to the bottom of the base; a second hinge component coupled to the first hinge component with a first fastener; the second hinge component connected to the first magnet and configured to allow the first magnet to rotate about the first predefined axis; and a first clamping lever connected to one end of the first fastener securing the second hinge component and first hinge component together.

The second hinge comprising: a third hinge component fixed to the bottom of the base; a fourth hinge component coupled to the third hinge component with the second fastener; the fourth hinge component connected to the second magnet and configured to allow the second magnet to rotate about the second predefined axis; and a second clamping lever connected to one end of the second fastener securing the fourth hinge component and third hinge component together. It is further envisioned in another embodiment, that the first and second predefined axes are parallel to the horizontal plane of the base.

In another embodiment of the present invention, it is envisioned that the first magnet is pivotally connected to the bottom of the base via a first ball and socket joint, the first portion of the ball and socket joint is fixed to the bottom of the base, the second portion of the ball and socket joint is attached to the first magnet and is configured to allow the first magnet to rotate about the first predefined axis.

The second magnet is pivotally connected to the bottom of the base via a second ball and socket joint, the first portion of the ball and socket joint is fixed to the bottom of the base, the second portion of the ball and socket joint is attached to the second magnet and is configured to allow the second magnet to rotate about the second predefined axis. Further, it is envisioned in another embodiment that the first ball and socket joint and the second ball and socket joint are securable in a fixed position and the base can be adjusted at varying angles with respect to the first and second predefined axes.

It is further envisioned that the apparatus may comprise a mounting piece attached to the top of the base using an attachment mechanism. In another embodiment, the hinges of the apparatus, the base and the mounting piece may be comprised of metal, or more specifically aluminum.

The invention is also directed to a method of stabilizing an adjustable mounting apparatus for metrology equipment during use, the method comprising: placing the mount onto a surface, rotating a first and second electric magnet at angles along predefined axes, engaging a clamping lever to place each magnet into desired positions on the surface, and electrifying the first and second electric magnets to attach them to the surface.

In another embodiment of the present invention, the invention is directed to an adjustable mounting apparatus for metrology equipment comprising: an aluminum base having a top and a bottom surface, the base defining a horizontal plane; an aluminum mounting piece attached to the top surface of the base; a first magnet pivotally connected to the bottom of the base with a first hinge, and rotatable about a first predefined axis, and a second magnet pivotally connected to the bottom of the base with a second hinge, and rotatable about a second predefined axis.

The first hinge comprising: a first hinge component fixed to the bottom of the base; a second hinge component coupled to the first hinge component with a first fastener, the second hinge component connected to the first magnet and configured to allow the first magnet to rotate about the first predefined axis; and a first clamping lever connected to one end of the first fastener securing the second hinge component and first hinge component together.

The second hinge comprising: a third hinge component fixed to the bottom of the base; a fourth hinge component coupled to the third hinge component with a second fastener, the fourth hinge component connected to the second magnet and configured to allow the second magnet to rotate about the second predefined axis; and a second clamping lever connected to one end of the second fastener securing the fourth hinge component and third hinge component together. The first and second magnets are positioned at opposing ends of the base and parallel to each other. The rotation of the first and second hinges is approximately 180 degrees about the first and second predefined axes and the first and second predefined axes is the rotation about the first and second hinge axes relative to the horizontal plane of the base. The first and second hinge axes are parallel to the horizontal plane of the base. It is further envisioned that the mounting piece is circular, with three recesses for attaching the mounting piece to the base. Further, the base is rectangular.

In yet another embodiment, the length of the base is between about 8 inches and about 12 inches, the width of the base is between about 4 inches and about 8 inches, and the thickness of the base is between about 0.5 inches and about 1 inch. It is further envisioned that the base, the mounting piece and the first and second hinges are comprised of machined 6061 aluminum which is anodized.

In another embodiment, the first hinge component is comprised of three members, each of the members having a first hinge component central recess. The second hinge component is comprised of two members, each of the members having a second hinge component central recess. The third hinge component is comprised of three members, each of the members having a third hinge component central recess. The fourth hinge component is comprised of two members, each of the members having a fourth hinge component central recess.

Still other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein.

DESCRIPTION

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

The invention described is directed to an adjustable mounting apparatus used to mount coordinate measurement equipment, laser trackers and other metrology devices such as but not limited to scopes, transits, levels, in a fixed location. The apparatus serves as an anchor point for the device while it is being used to perform measurements. The adjustability and small footprint of the apparatus allows for it to be mounted on round, uneven, and oddly shaped surfaces in addition to other surfaces, such as but not limited to level surfaces, sloped surfaces, etc.

Figure 1:
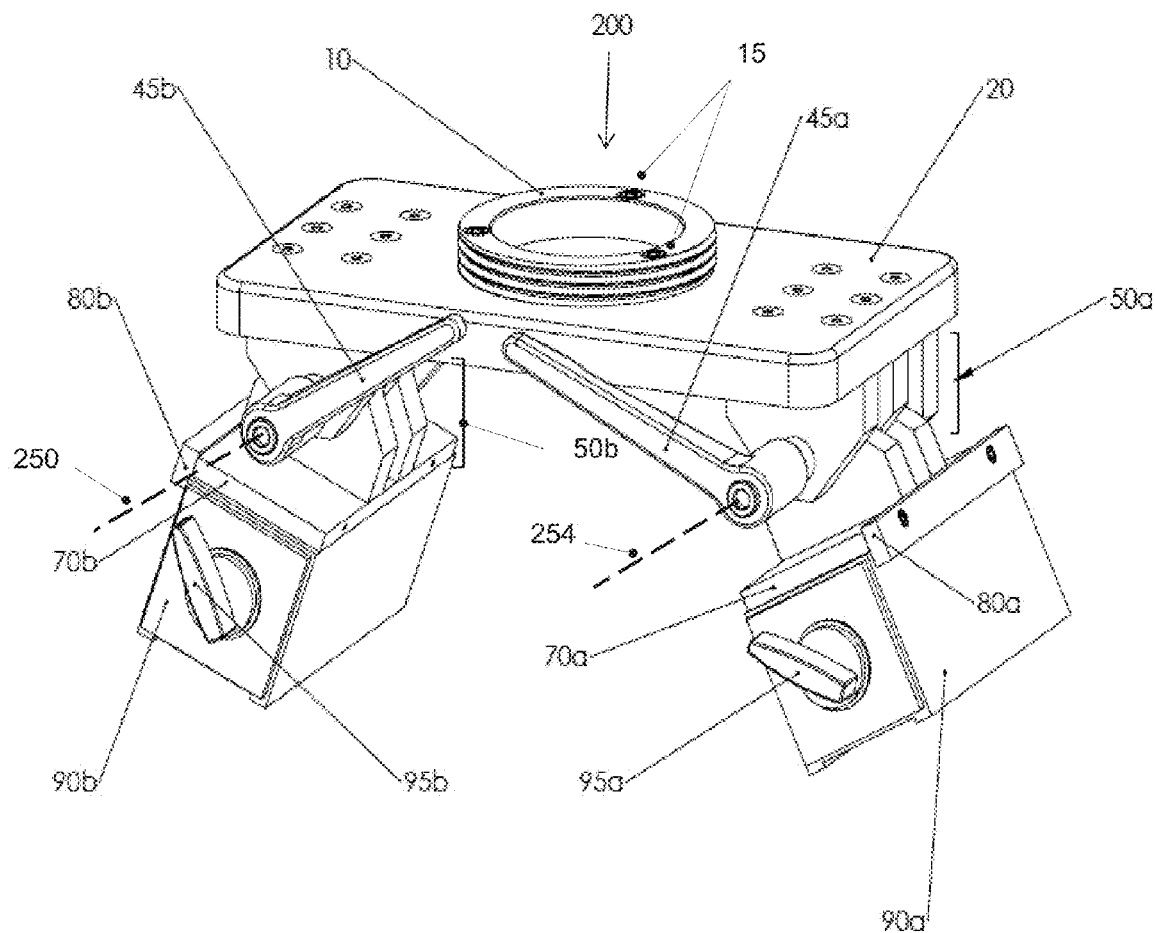
FIG. 1 is a perspective view of the mounting apparatus.

FIG. 1 is a perspective view of one embodiment of the apparatus 200. The apparatus 200 comprises a mounting device 10, a base plate 20, two hinges (50a, 50b), two magnetic base top plates (70a, 70b), two magnetic side plates (80a, 80b), a first magnet 90a and a second magnet 90b. In this embodiment, the hinges are pivotally connected to the magnets, however, it is envisioned that ball and socket joints may be pivotally connected to the magnets or any other device now known or later discovered which is suitable for rotating the magnets into the desired position.

The mounting device 10 is the point of attachment for the various types of measurement devices. The mounting device 10 shown has three recesses 15 equally spaced apart which accept connectors 19 (not shown). The connectors 19 feed through the top of the mounting device recesses 15 into the base 20 and secure the mounting device 10 to the base 20. The connectors 19 used to attach the mounting device 10 to the base plate 20 may be screws, or other similar purpose mechanisms. The mounting piece 10 shown is circular with male threads designed to accept a female threaded connector, but may be of any design appropriate to accept the different types of measurement devices used in to take measurements, including flange devices, clamping devices and any other type which serves the same purpose.

One of ordinary skill in the art would also recognize that although a circular mounting piece 10 is shown, other shapes can also be used without departing from the scope of the invention. Some examples would include square and rectangular mounting pieces.

The base 20 may also be of varying sizes necessary to accommodate a measuring device required for a particular application. The first and second magnets (90a, 90b) each have an activating switch (95a, 95b) which can be activated once the device is set into place on a surface. Once engaged, the first and second magnets (90a, 90b) secure the apparatus 200 into position. Any type of magnetic material now known or later discovered may be used for securing the apparatus 200 into place that serves the purpose desired.

In this embodiment there is a first magnet 90a and a second magnet 90b attached to the base 20, however, it is envisioned, that different applications may require more than two magnets, as the size of the measuring device or the size of the apparatus increases, thus, it is envisioned that in some instances three or more magnets may be mounted along the bottom of the base 20 relative to each other. Further, the first and second magnets (90a, 90b) used in this application are electrically charged, but it is envisioned that any means necessary to secure the magnets to the base may be used.

Figure 2:
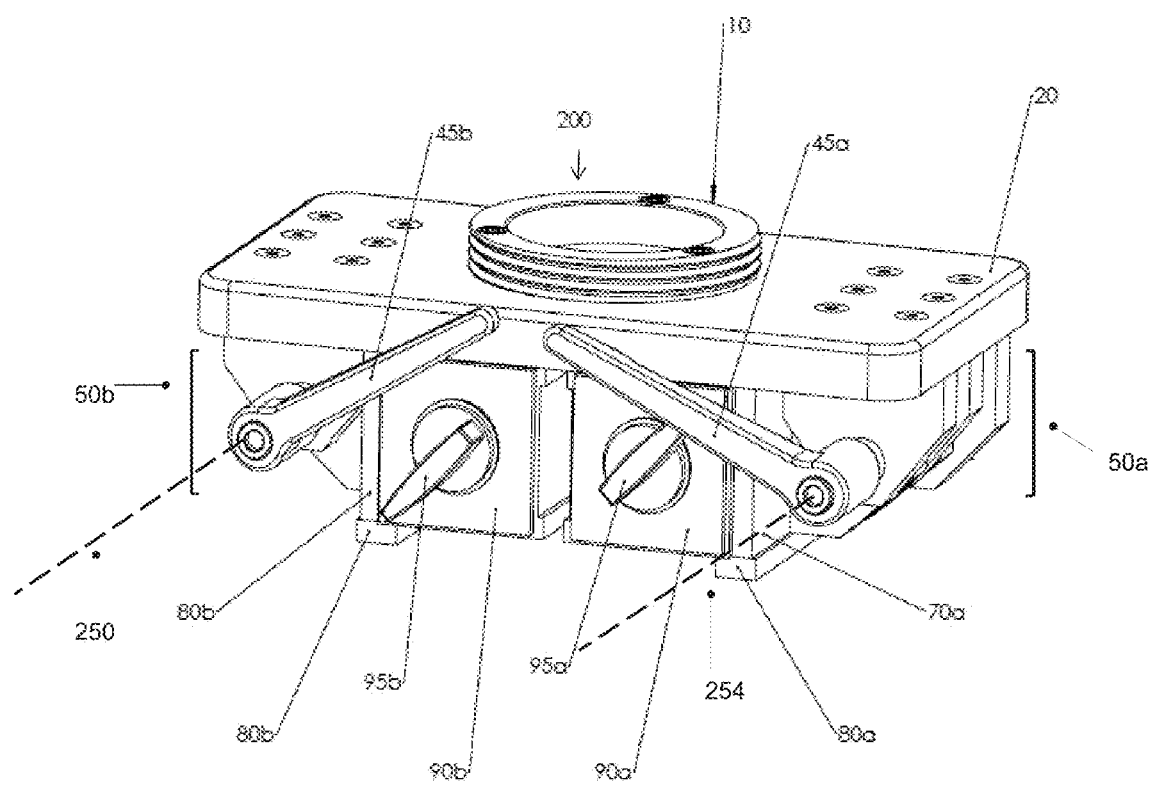
FIG. 2 is a view of the apparatus in the closed position.
Figure 3:
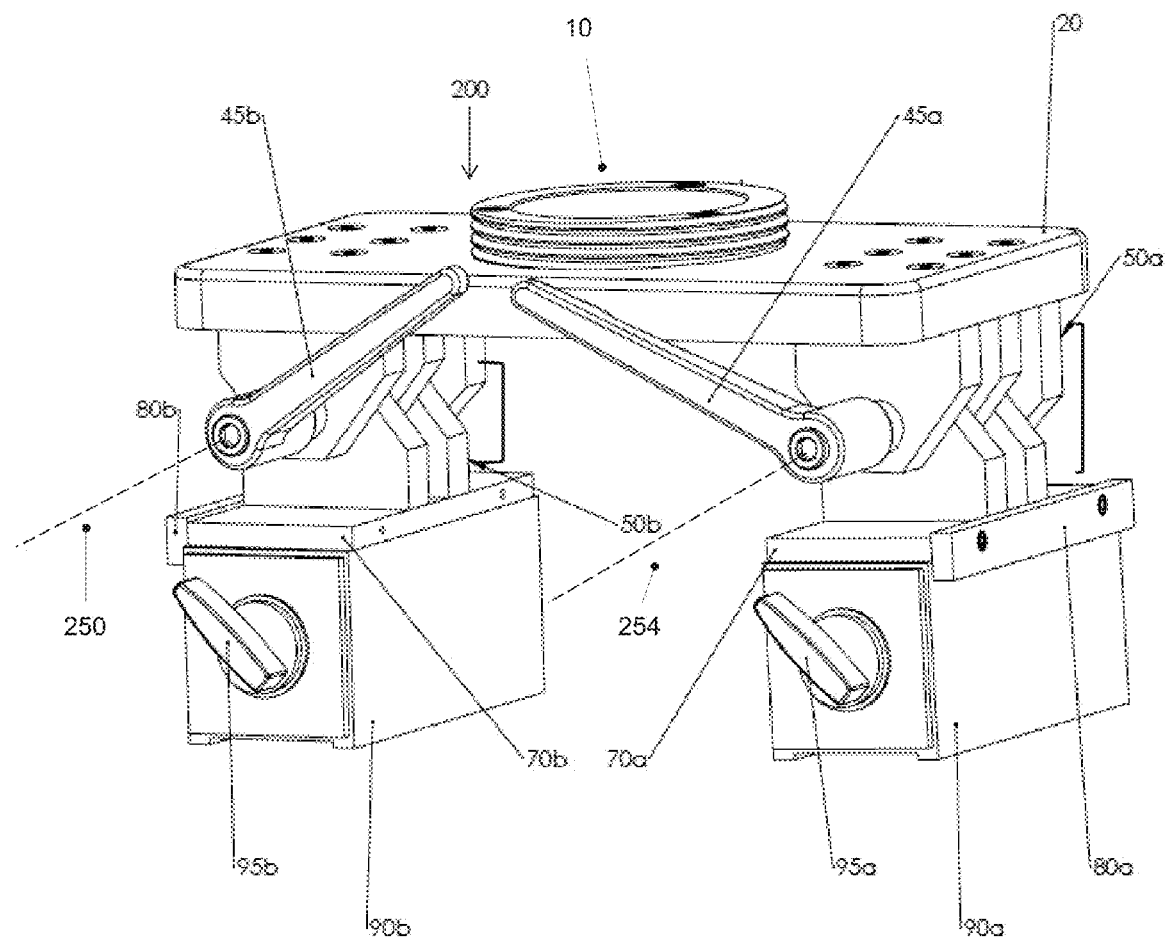
FIG. 3 is a perspective view of the apparatus in the open position.
Figure 4:
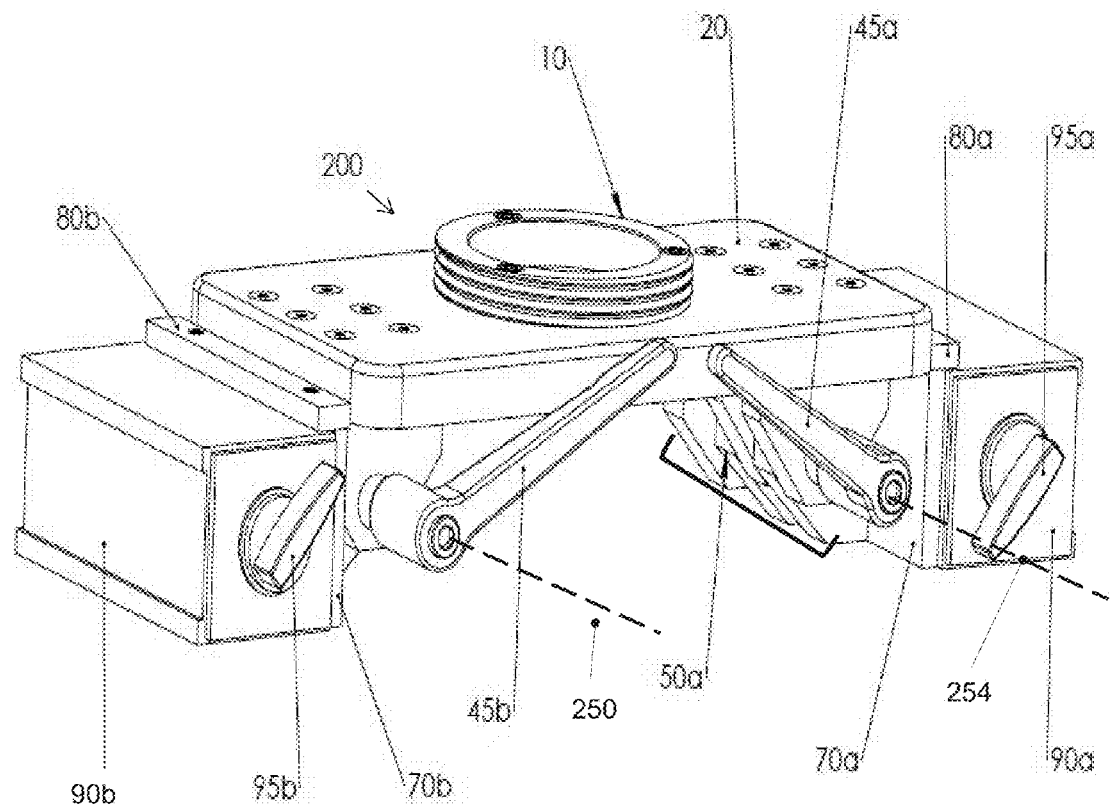
FIG. 4 is a view of the apparatus in the fully extended position.

FIG. 2-4 are views of the invention shown in various positions demonstrating the method of using the equipment. Starting from a closed position, (FIG. 2), a user may take the mounting apparatus 200 from a partially open position (FIG. 3) to a fully open position (FIG. 4). The first and second hinge connections (50a, 50b) shown in these embodiments, allow for a full range of motion of about 180 degrees around the first and second hinge axes (254, 250) relative to the horizontal plane of the base 20. In other embodiments, the range of motion of the first and second hinges (50a, 50b) may vary from other ranges of motion about the horizontal plane of the base 20, including but not limited to about 360 degrees around the first and second hinge axes (254, 250) relative to the horizontal plane of the base 20. The mounting apparatus 200 can be mounted on many types of uneven surfaces, including concave surfaces, convex or bell-shaped surfaces, staggered surfaces, sloping surfaces, and other surface shapes. It is also envisioned that the mounting apparatus 200 can be installed in an inverted position, or, with different placement of the first and second hinges (50a, 50b), even allowing for the position of the mounting apparatus 200 to be hanging from a surface, or attached to the inner side walls of a surface.

The base 20, hinges (50a, 50b) and mounting piece 10 may be manufactured of any type of material now known or later discovered which serves the purpose of the mounting apparatus 200. For example, the material may be a type of metal, including aluminum, or specifically, as shown in the embodiments, machined 6061 aluminum which is anodized (hard-coated) in order to make it more corrosion and abrasion resistant.

FIG. 2 is a view of the mounting apparatus 200 with the first magnet 90a and second magnet 90b in the closed position allowing for easy transport of the mounting apparatus 200. In the embodiment shown, the first and second hinges (50a, 50b) are pivotally connected to the mounting apparatus 200. To place the mounting apparatus 200 in this position from an extended (open) position, the user loosens the first and second clamping levers (45a, 45b) on the first and second hinges (50a, 50b) attached to the bottom of the base 20. The user rotates the first and second magnets (90a, 90b) towards the center of the base 20. Once the first and second magnets (90a, 90b) are positioned against the bottom of the base 20, the first and second clamping levers (45a, 45b) are engaged, and the first and second magnets (90a, 90b) are secured in the closed position and the mounting apparatus 200 may be transported. The first and second clamping levers (45a, 45b) secure the first and second hinges (50a, 50b) into the closed position when tightened, to prevent opening of the mounting apparatus 200 during travel.

FIG. 3 is perspective view of the apparatus 200 in the open position. In this embodiment, the first and second magnets (90a, 90b) are extended perpendicularly to the base 20. The first and second magnets (90a, 90b) shown are attached to the base 20 using first and second hinges (50a, 50b). The first and second magnets (90a, 90b) are extended outwardly at a 90 degree angle from the base 20. Once the first and second magnets (90a, 90b) are placed into this position, the first and second clamping levers (45a, 45b) are tightened, securing the first and second hinges (50a, 50b) in place and the first and second magnets (90a, 90b) are secured to the desired surface by engaging the switches (95a, 95b).

FIG. 4 is a view of the apparatus 200 in the fully extended open position. In this position, the second magnet 90b and the first magnet 90a are extended outwardly from the base 20. The first and second magnets (90a, 90b) in this position extend outwardly at a 90 degree angle from the central open position, shown in FIG. 3 and a full 180 degree angle of rotation from the closed position shown in FIG. 2. From this position, the first and second magnets (90a, 90b), can be locked into place by tightening the first and second clamping levers (45b, 45a), on each of the first and second hinges (50b, 50a), and attached to a surface by engaging the switches (95a, 95b) on the first and second magnets (90b, 90a).

In FIG. 1-4, the first and second hinges (50a, 50b) rotate about a first and second predefined axis (254, 250). The axes are shown by the lines 250 and 254. The predefined axis is created by the first and second hinges (50a, 50b), and is the hinge axis defined by the relationship of the hinge components relative to each other. The rotation of the lower hinges around the fasteners (35a, 35b not shown), creates the hinge axes 250, 254. In this embodiment, the hinge axes (250, 254) are parallel to the horizontal plane of the base 20. It is envisioned however, that the first and second hinges (50a, 50b) could be mounted so that the predefined axes created by the first and second hinges (50a, 50b) would be perpendicular to the horizontal plane of the base 20 as well. An example of this would be if it was desired to have a mounting apparatus 200 that attached to the inner sidewalls of a pipe or tube surface, where the magnets ran parallel to the sidewalls instead of perpendicularly.

The angle of rotation along the hinge axes (254, 250) parallel to the horizontal plane of the base 20 as shown in the embodiment, can be anywhere from about 0 to about 180 degrees depending on the starting position of the first and second magnets (90a, 90b). In other embodiments, the rotation may be anywhere from 0 to 360 degrees. This is due to the positioning of the first and second hinges (50a, 50b) relative to the base 20. It is envisioned that different configurations of the base 20 as well as different positioning of the first and second hinges (50a, 50b) on the bottom of the base 20 would allow for a greater angle of rotation of the magnets (90a, 90b). For example, the first and second hinges (50a, 50b) could be fixed to the bottom of the base 20 at a greater distance apart from each other, allowing the first and second hinges (50a, 50b) to extend outwardly from a starting position of 0 degrees (in the closed position) to a full 360 degrees of rotation, along the axes (250, 254) of the first and second hinges (50a, 50b).

Figure 5:
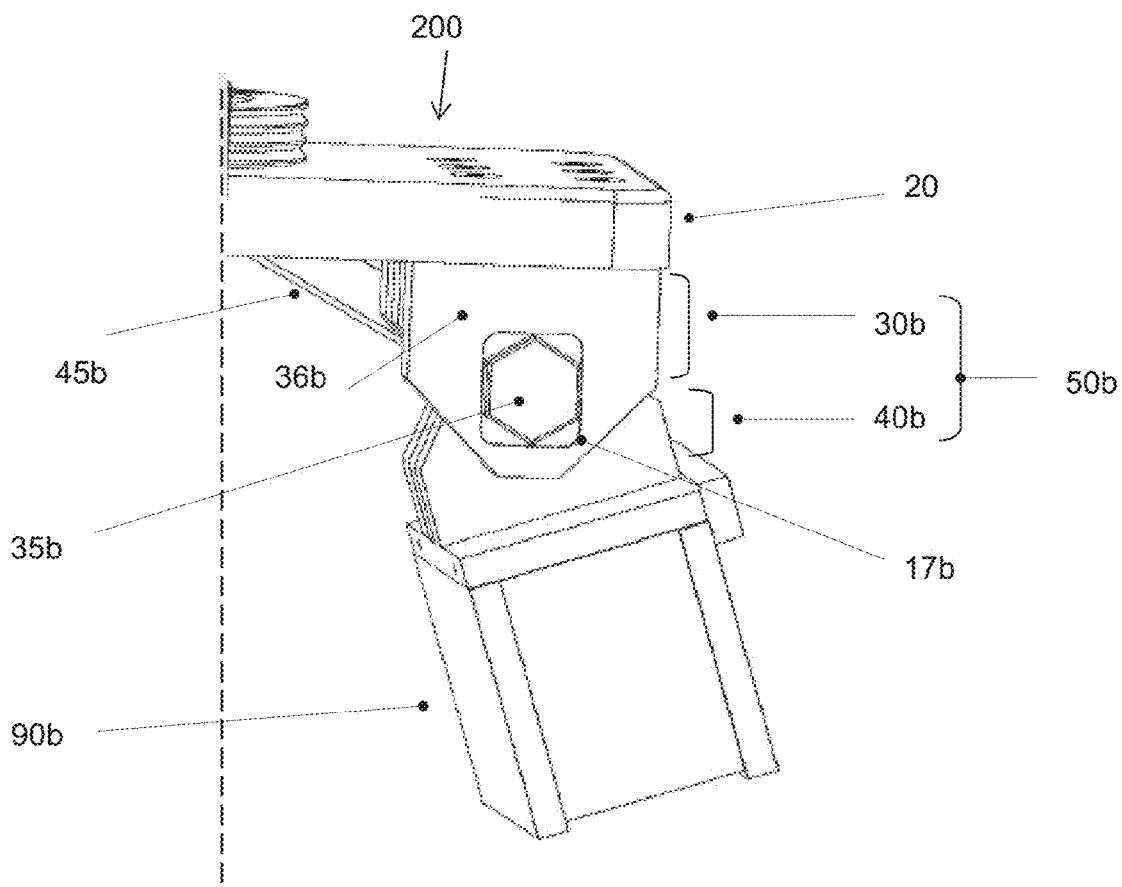
FIG. 5 is a view of the right side of the hinge connection of the apparatus from the rear.
Figure 6:
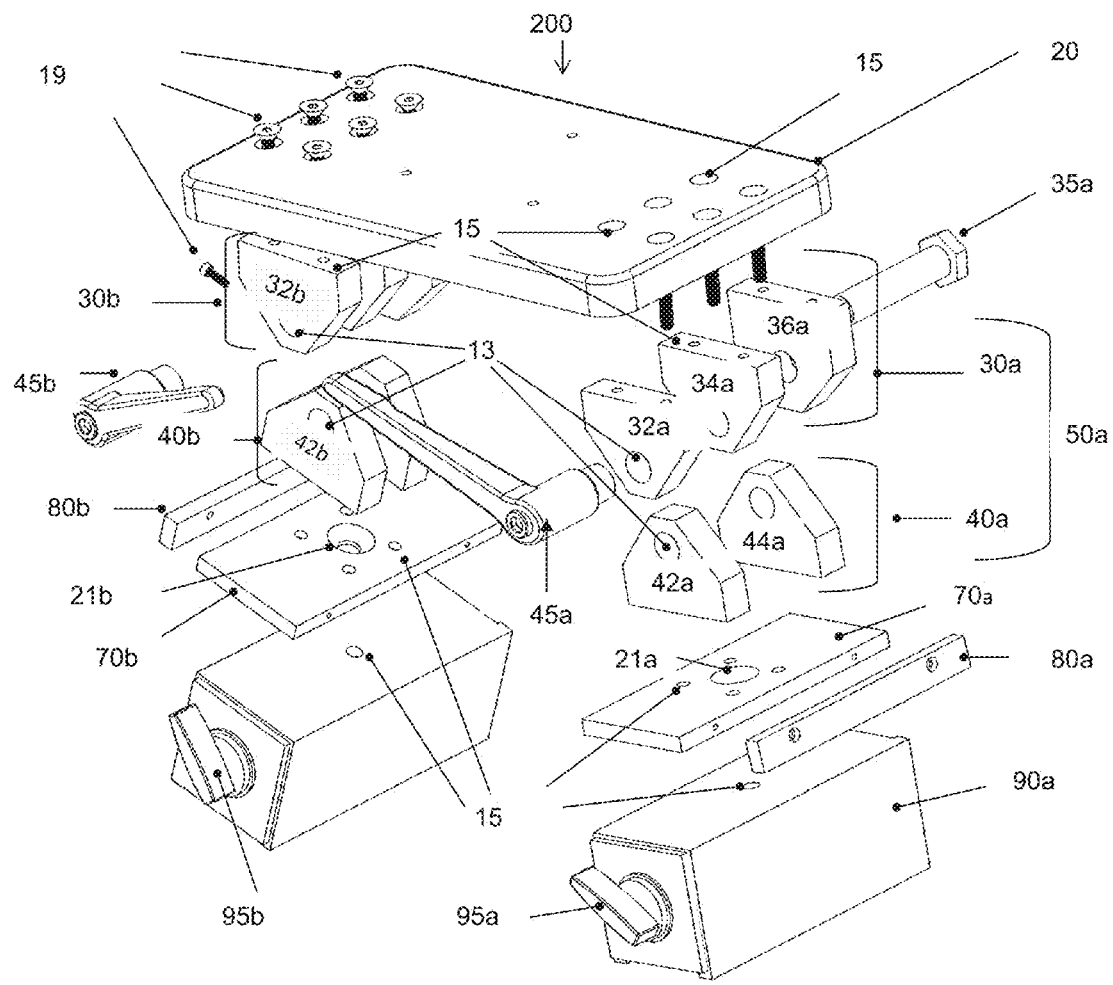
FIG. 6 is an exploded view of the pivotal connection in one embodiment utilizing hinge connections.

FIG. 5-6 are embodiments of the invention utilizing first and second hinges (50a, 50b), however, any connector which is suitable, now known or later discovered may be used which are able to rotate the first and second magnets (90a, 90b) in the desired position. For example, in some instances, the surface may not only be curved or uneven, but also sloped or angled requiring the base of the mounting apparatus 200 to be leveled prior to taking the required measurements. In this case, a ball and socket joint pivotally connected to the base would be more suitable since a ball and socket type of joint allows for movement along the three dimensional axes.

The first and second hinges (50a, 50b) are attached to the bottom of the base 20 and parallel to each other. The first and second hinges (50a, 50b) may be mounted in any location desired on the bottom of the base 20 to accommodate varying types of measuring apparatus for different applications. FIG. 5 is a view of the right side of the second hinge connection 50b of the mounting apparatus 200 from the rear. The right and left side of the mounting apparatus 200 are identical, so only the right side will be discussed with the understanding that the sides are mirror images of each other. The second hinge 50b attaches to the second magnet 90b. The hinge 50b comprises a fixed third hinge component 30b, connected to the bottom of the base 20, and a fourth hinge component 40b coupled to the third hinge component 30b with a second fastener 35b. In this embodiment, the fourth hinge component 40b is able to rotate the second magnet 90b in a full about 180 degree angle of rotation about the hinge axis 250 (not shown) but as discussed above, it is envisioned that the angle of rotation could be increased with different mounting positions. The second fastener 35b, couples the third and fourth hinge components (30b, 40b) together.

The second fastener 35b shown in FIG. 5, is a shoulder bolt, but any suitable fastener which serves the same purpose may be used. The second clamping lever 45b, connects to one end of the second fastener 35b, securing the fourth hinge component 40b, and third hinge component 30b together. Once the second magnet 90b is set into position, the second hinge 50b is tightened by adjusting the second clamping lever 45b against the second fastener 35b, to secure it into position, preventing movement of the second hinge 50b. Third hinge component block 36b which mates up to the second fastener 35b has a rectangular recess 17b designed to allow the second fastener 35b to fit into the third hinge component block 36b, allowing for a smoother surface. The rectangular recess 17b, is only located on third hinge component block 36b which mates up to the top of the second fastener 35b. The outer first hinge component block 36a (not shown), also has an identical rectangular recess 17a (not shown), located on the first hinge component block 36a (not shown), which serves the same purpose.

FIG. 6 is an exploded view of the apparatus 200. The left and right side of the apparatus are mirror images, thus for ease of explanation, the left side will be discussed with reference to the drawing, with the understanding that the right side is the same and operates in the same manner. The first hinge 50a comprises a first hinge component 30a, comprising three first hinge component blocks (32a, 34a, 36a), and a second hinge component, 40a, comprising two second hinge component blocks (42a, 44a). The first hinge component 30a and second hinge component 40a are connected together by the first fastener 35a. The first fastener 35a is fed through the centrally located recesses 13 on the first and second hinge components (30a, 40a) of the first hinge 50a and secures the position of the first magnet 90a by attaching to the first clamping lever 45a. The second hinge component 40a attaches to the first magnet 90a with a magnetic base top plate 70a and a magnetic base side plate 80a.

Each of the first hinge component blocks (32a, 34a, 36a) of the first hinge component 30a have two upper recesses 15 for attaching to the bottom of the base 20 with a connector 19. The connectors 19 feed through recesses 15 in the base 20 into the first hinge component blocks (32a, 34a, 36a) and secure the first hinge component blocks (32a, 34a, 36a) in a fixed position to the base 20. The first hinge component blocks (32a, 34a, 36a) each receive two connectors 19. The first hinge component blocks (32a, 34a, 36a) are secured to the bottom of the base 20, and remain stationary once installed.

The first hinge component blocks (32a, 34a, 36a) have a centrally located recess 13 designed to accept the fastener 35a.

The second hinge component 40a comprises two second hinge component blocks (42a, 44a). The second hinge component blocks (42a, 44a) create the second hinge component 40a. The base of each of the second hinge component blocks (42a, 44a) has two recesses 15 which are designed to accept two connectors 19. The second hinge component blocks (42a, 44a) also have a centrally located recess 13 designed to accept the fastener 35a.

The second hinge component blocks (42a, 44a) are secured to the magnetic base top plate 70a. There are four outer recesses 15 in the magnetic base top plate 70a, and a middle recess 21a. Two recesses 15 are for each of the second hinge component blocks (42a, 44a), and one middle recess 21a which attaches the magnetic base top plate 70a to the first magnet 90a. The magnetic base top plate 70a, also has two recesses 15 located in the side of the magnetic base top plate 70a to connect the magnetic base side plate 80a to it with two connectors 19. To attach the magnetic base top plate 70a to the second hinge component blocks (42a, 44a), two connectors 19 are fed through the recesses 15 and threaded to the second hinge component blocks (42a, 44a). The magnetic base side plate 80a attaches to the side of the magnetic base top plate 70a via the two side recesses 15 located on the magnetic base top plate 70a, and two recesses 15 located on the magnetic base side plate 80a. A connector 19 is fed through both of the side recesses 15 located on the magnetic base side plate 80a, securing the magnetic base side plate 80a to the magnetic base top plate 70a. The middle recess 21a on the magnetic base top plate 70a attaches to the first magnet 90a through the middle recess 21a with a connector 19. The connector 19 (in this embodiment a screw) is threaded through the middle recess 21a into the first magnet 90a and attaches the first magnet 90a to the magnetic base top plate 70a.

Figure 7:
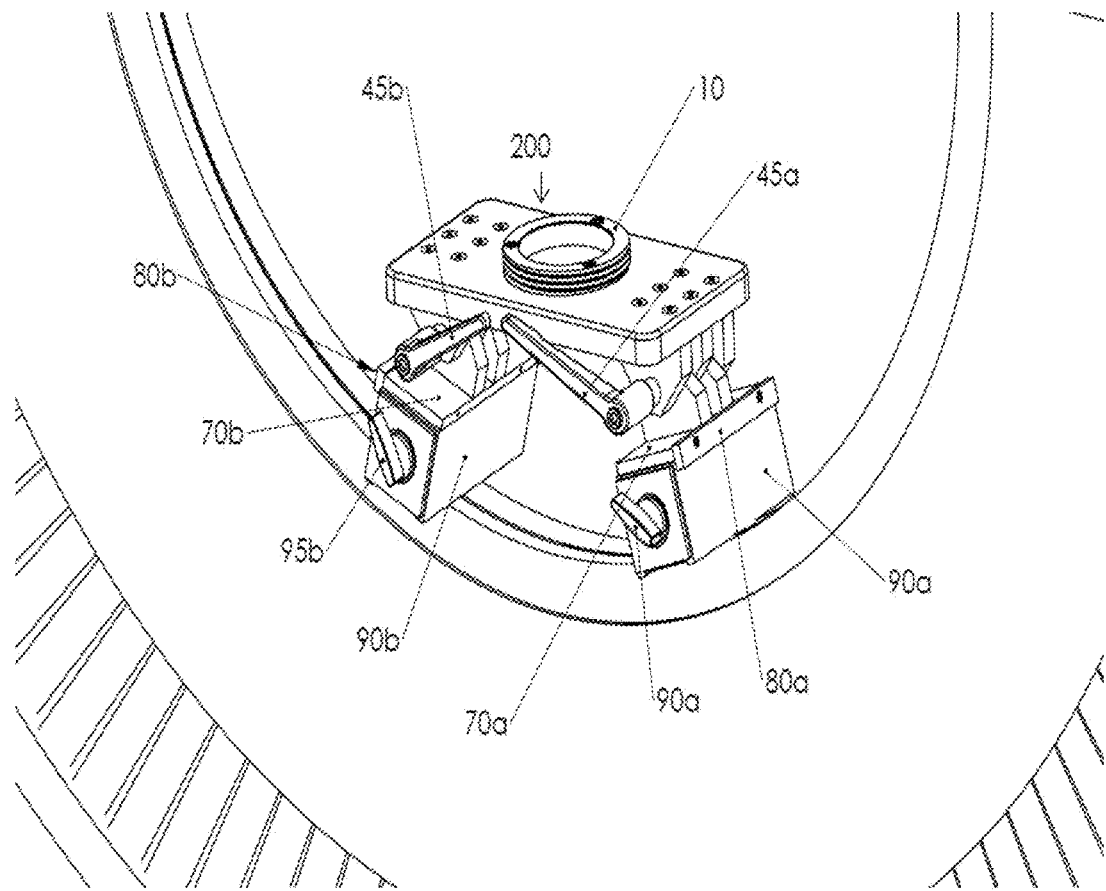
FIG. 7 is a frontal perspective view of the apparatus when installed on an uneven surface.

FIG. 7 is a frontal view of the apparatus 200 installed on an uneven, concave surface. To attach the apparatus 200, the first and second clamping levers (45a, 45b) are released, and the first and second magnets (90a, 90b) are moved into the positions to level the mounting apparatus 200. Once the mounting apparatus 200 is situated properly, the first and second clamping levers (45a, 45b) are locked into place, and the first and second magnets (90a, 90b) are activated by turning on the magnetic switches (95a, 95b).

Figure 8:
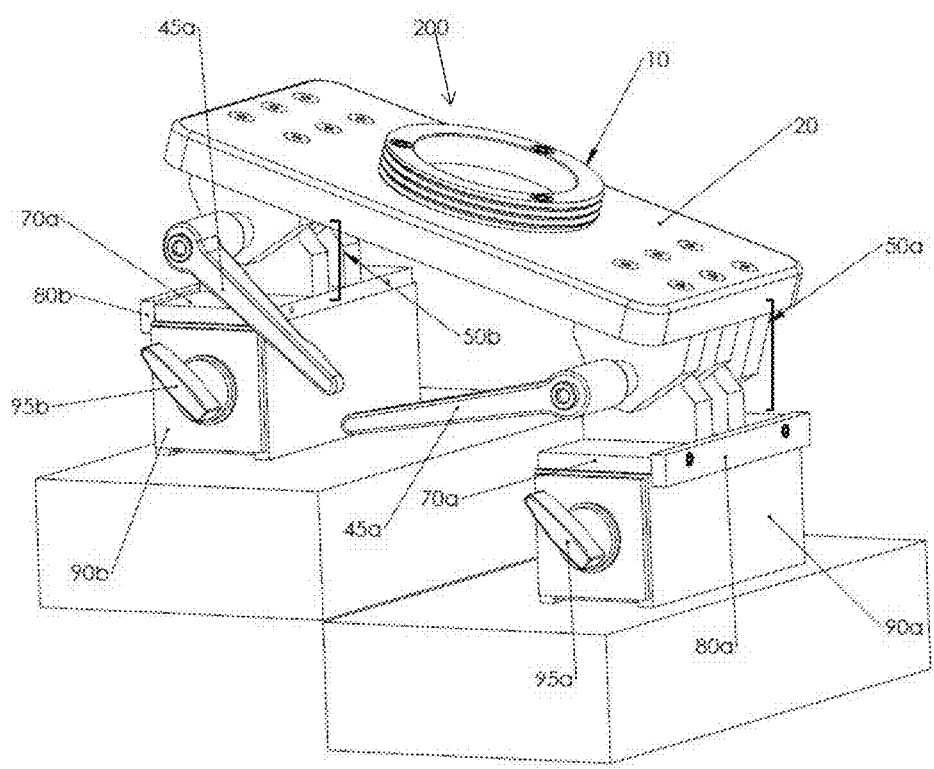
FIG. 8 is a frontal perspective view of the apparatus when installed on an uneven surface.

FIG. 8 is a frontal view of the mounting apparatus 200 in another embodiment when installed on an uneven surface. In this embodiment, the mounting apparatus 200 is mounted on a staggered surface. The mounting apparatus 200 is attached by placing the first and second magnets (90a, 90b) in the appropriate positions, engaging the first and second clamping levers (45a, 45b), and activating the first and second magnets (90a, 90b) to attach them to the surface.

Figure 9:
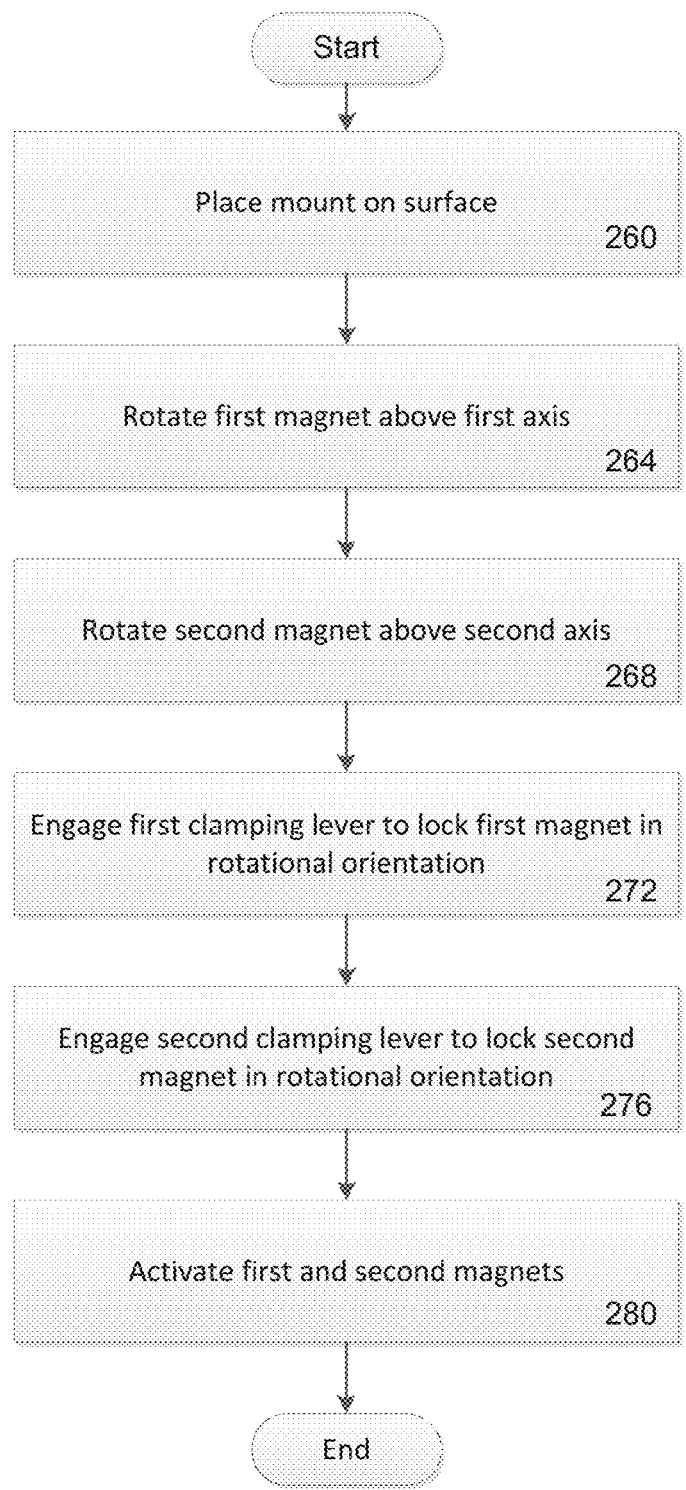
FIG. 9 is a flowchart disclosing the method for stabilizing the apparatus during use.

FIG. 9 is a flowchart of the method of stabilizing the mounting apparatus 200. To stabilize the mounting apparatus 200, the user first places the mounting apparatus on the surface 260. The user then rotates the first magnet above the first axis 264. The user then rotates the second magnet about the second axis 268. Once the mounting apparatus has been placed in the desired position, the user engages the first clamping lever to lock the first magnet in the desired rotational orientation 272. The user then engages the second clamping lever to lock the second magnet in rotational orientation 276. Finally, the user activates the first and second magnets to secure the device 280.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term includes is used in either the detailed description or the claims, such term is intended to be inclusive in a manner similar to the term comprising as comprising is interpreted when employed as a transitional word in a claim.

What is claimed is:

1. An adjustable mounting apparatus for metrology equipment comprising:
   an aluminum base, having a top and a bottom surface, the base defining a horizontal plane;
   an aluminum mounting piece attached to the top surface of the base for supporting the metrology equipment
   a first magnet pivotally connected to the bottom of the base with a first hinge, the first magnet rotatable about a first predefined axis,
      the first hinge comprising:
         a first hinge component fixed to the bottom of the base;
         a second hinge component coupled to the first hinge component with a first fastener, the second hinge component is connected to the first magnet, the second hinge component configured to allow the first magnet to rotate about the first predefined axis;
         a first clamping lever connected to one end of the first fastener securing the second hinge component and first hinge component together for securing the position of the first magnet;
   a second magnet pivotally connected to the bottom of the base with a second hinge, the second magnet rotatable about a second predefined axis,
      the second hinge comprising:
         a third hinge component fixed to the bottom of the base;
         a fourth hinge component coupled to the third hinge component with the second fastener, the fourth hinge component is connected to the second magnet, the fourth hinge component configured to allow the second magnet to rotate about the second predefined axis;
         a second clamping lever connected to one end of the second fastener securing the fourth hinge component and third hinge component together;
   wherein the first and second magnets are positioned at opposing ends of the base and parallel to each other;
   wherein the rotation of the first and second hinges is approximately 180 degrees about the first and second predefined axes, the first and second predefined axes is the rotation about the first and second hinge axes relative to the horizontal plane of the base, the first and second hinge axes are parallel to the horizontal plane of the base, wherein the first and second magnets are adapted to be mounted on a surface of object to stabilize the metrology equipment.

2. The apparatus of claim 1, wherein the first and second hinges are comprised of metal.

3. The apparatus of claim 2 wherein the metal is aluminum.

4. The apparatus of claim 3, wherein the mounting piece is circular, the mounting piece having three recesses for attaching the mounting piece to the base.

5. The apparatus of claim 4, wherein the base is rectangular.

6. The apparatus of claim 5 wherein, the length of the base is between about 8 inches and about 12 inches, the width of the base is between about 4 inches and about 8 inches, and the thickness of the base is between about 0.5 inches and about 1 inch.

7. The apparatus of claim 6, wherein the base, the mounting piece and the first and second hinges are comprised of machined 6061 aluminum which is anodized.

8. The apparatus of claim 7 wherein,
   the first hinge component is comprised of three members, each of the members having a centrally located recess in the first hinge component;
   the second hinge component is comprised of two members, each of the members having a centrally located recess in the second hinge component;
   the third hinge component is comprised of three members, each of the members having a centrally located recess in the third hinge component;
   the fourth hinge component is comprised of two members, each of the members having a centrally located recess in the fourth hinge component.

* * * * *